United States Patent
Allen et al.

(10) Patent No.: US 6,796,470 B2
(45) Date of Patent: Sep. 28, 2004

(54) COUPLING DEVICE FOR A VEHICLE RACK

(75) Inventors: Scott R. Allen, Fieldbrook, CA (US); Timothy C. Smith, McKinleyville, CA (US); Joseph J. Settelmayer, Fieldbrook, CA (US)

(73) Assignee: Watermark PaddleSports, Inc., Arcata, CA (US)

( * ) Notice: Subject to any disclaimer, the term of this patent is extended or adjusted under 35 U.S.C. 154(b) by 45 days.

(21) Appl. No.: 10/165,429

(22) Filed: Jun. 6, 2002

(65) Prior Publication Data

US 2003/0085247 A1 May 8, 2003

Related U.S. Application Data

(60) Provisional application No. 60/297,211, filed on Jun. 6, 2001.

(51) Int. Cl.[7] .................................................. B60R 9/00
(52) U.S. Cl. ...................................... 224/315; 224/321
(58) Field of Search ................................ 284/315, 321, 284/323, 331

(56) References Cited

U.S. PATENT DOCUMENTS

| | | | | |
|---|---|---|---|---|
| 4,273,278 A | * | 6/1981 | Storm | 224/321 |
| 5,275,320 A | | 1/1994 | Duemmler | |
| 5,423,465 A | * | 6/1995 | Kauka et al. | 224/321 |
| 5,470,003 A | * | 11/1995 | Cucheran | 224/321 |
| 5,492,258 A | * | 2/1996 | Brunner | 224/321 |
| 5,549,229 A | * | 8/1996 | Grabowski | 224/321 |
| 5,577,649 A | | 11/1996 | Lee, Jr. et al. | |
| 5,732,863 A | * | 3/1998 | Stapleton | 224/321 |
| 5,758,810 A | | 6/1998 | Stapleton | |
| 6,105,841 A | | 8/2000 | Aftanas | |
| 6,126,051 A | * | 10/2000 | Potter | 224/321 |
| 6,131,782 A | | 10/2000 | De Silva et al. | |
| 6,179,179 B1 | * | 1/2001 | Potter et al. | 224/321 |
| 6,561,397 B1 | * | 5/2003 | Bauer et al. | 224/321 |

FOREIGN PATENT DOCUMENTS

DE          3904700          8/1990

* cited by examiner

Primary Examiner—Nathan J. Newhouse
(74) Attorney, Agent, or Firm—Kolisch Hartwell, P.C.

(57) ABSTRACT

A coupling device for coupling a rack component, such as a crossbar, to a vehicle rack, and apparatus that include the coupling device. The coupling device includes a first portion for attachment to the rack component and a second portion for coupling to the vehicle rack. A fastener member moves along an axis to couple the second portion to the vehicle rack. The coupling device also includes a security mechanism. The security mechanism may be implemented volitionally and/or irreversibly. The security mechanism prohibits movement of the fastener member that would uncouple the second portion from the vehicle rack but allows limited movement of the fastener member along the axis. The limited movement adjusts the second portion between fixed and movable conditions on the vehicle rack, allowing the rack component to be re-positioned on the vehicle rack but not removed.

45 Claims, 1 Drawing Sheet

COUPLING DEVICE FOR A VEHICLE RACK

CROSS-REFERENCE

This application claims priority under 35 U.S.C. §119 from U.S. Provisional Patent Application Serial No. 60/297,211, filed Jun. 6, 2001, which is incorporated herein by reference in its entirety for all purposes.

FIELD OF THE INVENTION

The present invention relates generally to coupling devices. More particularly the invention relates to coupling devices for attaching components to vehicle racks.

BACKGROUND OF THE INVENTION

Vehicle racks may be installed at the factory. These factory-installed vehicle racks generally include longitudinal side rails that are permanently attached to the vehicle. However, transversely extending crossbars often are not installed at the factory, but are added later. Crossbars come in a variety of styles and thus a specific style may be selected and attached by the dealer or the owner.

Crossbars may be attached permanently or removably to the side rails. Each of these approaches suffers from disadvantages. When the crossbars are attached permanently to the side rails, for example through welding or with a strong adhesive, the crossbars cannot be removed easily by others. However, the crossbars are not re-positionable along the side rails, preventing adjustment of the distance between crossbars for specific carrying needs. In addition, special equipment or training may be necessary to carry out this permanent attachment. On the other hand, when crossbars are attached removably, attachment may be easier and crossbar spacing is re-adjustable. However, a thief can remove the crossbars and steal items carried by the crossbars. Therefore, a permanently attached, but re-positionable crossbar is needed.

SUMMARY OF THE INVENTION

A coupling device and apparatus are provided for coupling a rack component, such as a crossbar, to a vehicle rack. The coupling device includes a first portion for attachment to the rack component and a second portion for coupling to the vehicle rack. A fastener member moves along an axis to couple the second portion to the vehicle rack. The coupling device also includes a security mechanism. The security mechanism may be implemented volitionally and/or irreversibly. The security mechanism prohibits movement of the fastener member that would uncouple the second portion from the vehicle rack but allows limited movement of the fastener member along the axis. The limited movement adjusts the second portion between fixed and movable conditions on the vehicle rack, allowing the rack component to be re-positioned on the vehicle rack but not removed.

DETAILED DESCRIPTION OF THE INVENTION

The present invention provides a coupling device and apparatus for attaching a vehicle rack component to a vehicle rack, for example, a crossbar to a side rail of the rack. The coupling device includes a fastener mechanism that engages to couple the crossbar to the side rail. The fastener mechanism is adjustable so that the crossbar is either fixed or movable on the side rail. Accordingly, the crossbar can be fixedly positioned at selected sites along the long axis of the side rail. The coupling device also includes a security mechanism that prohibits complete disengagement of the fastener mechanism, thus prohibiting removal of the crossbar from the side rail. In some embodiments the security mechanism is intended to be implemented irreversibly, providing a permanent coupling between the crossbar and side rail.

Figure 1:
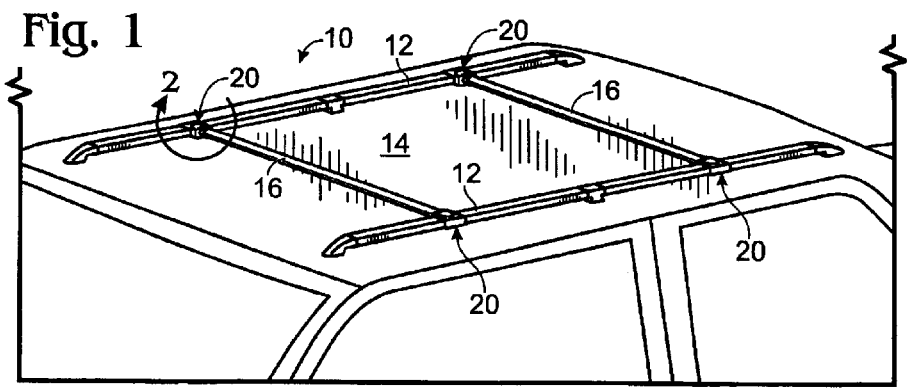
FIG. 1 is a fragmentary perspective view of a vehicle with a mounted vehicle rack having two crossbars attached at their ends to side rails of the vehicle rack using embodiments of a coupling device constructed in accordance with aspects of the invention.

FIG. 1 shows a vehicle 10 with side rails 12 mounted on a surface 14 of the vehicle. Side rails 12 are generally mounted parallel, spaced from surface 14 and aligned with a long axis of the vehicle 10. Here, surface 14 is a roof of vehicle 10, but other generally horizontal vehicle surfaces also may be suitable, such as a bed of a truck, a rear portion of a sedan, or so on. The rails may be permanently attached, for example, factory-installed, or may be removable but locked onto the vehicle. Furthermore, other rail configurations may be suitable, such as transverse, among others. Crossbars 16 are attached to side rails 12, extending transversely to side rails 12 and the vehicle's long axis. Here, crossbars are depicted as having a circular transverse cross section. However, other cross-sectional geometries may be suitable including oval, square, rectangular, combinations thereof, or the like.

Crossbars 16 are attached to side rails 12 using coupling devices 20, generally as pairs of devices that flank each crossbar. Alternatively, crossbars may carry only a single coupling device 20 at one end, with a different type of coupling at an opposing end. Devices 20 may be configured to have an adjustable grip on side rail 12, as described below. Tightening the grip fixes the position of the crossbar on the side rail. By contrast, loosening the grip allows the crossbar to be slidably re-positioned along the side rails. Alternatively, or in addition, coupling devices may be used to join a rack component to a vehicle rack. Rack components may include rack accessories for carrying cargo, such as sports equipment, luggage, lumber, tools, etc. Vehicle racks may include any frame or portion thereof that is attached to a surface of a vehicle.

Figure 2:
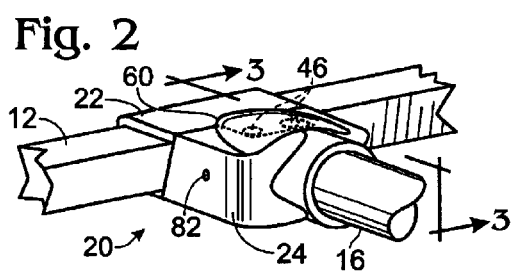
FIG. 2 is a fragmentary isometric view of the vehicle rack of FIG. 1, showing one of the coupling devices in more detail.
Figure 3:
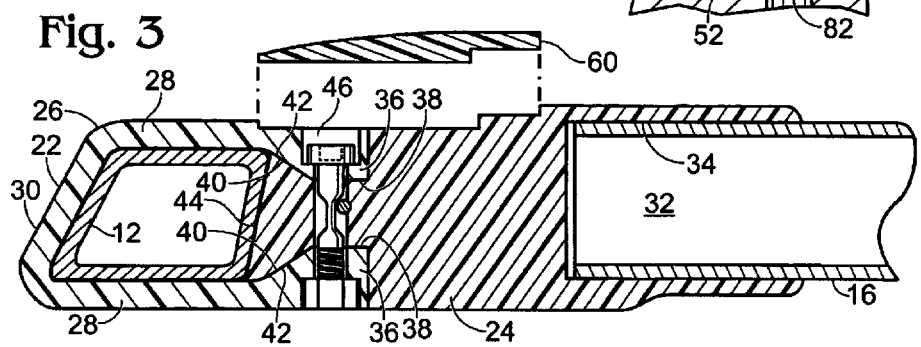
FIG. 3 is a cross-sectional view of the coupling device of FIG. 2 viewed generally along 3—3 of FIG. 2, with the device fixedly positioned by a grip on the side rail.

FIGS. 2 and 3 show coupling device 20 in more detail. Coupling device 20 includes two portions that join to each other and to rail 12 or crossbar 16. The two portions may be formed unitarily or separately. For example, the portions may be structured as a clamp 22, and a receiver 24 that fits together with clamp 22. Each of clamp 22 and receiver 24 may be formed of any suitable materials including a molded plastic, metal, and/or rubber, among others.

Clamp 22 is structured to be coupled to, and to adjustably grip, side rail. Clamp 22 includes a rail-coupling region 26 having opposing arms 28 that extend above and below side rail 12. Arms 28 may be separated at a later position on the rail or may be joined by lateral connector 30. Here, rail-coupling portion 26 is formed integrally and extends around side rail 12, with an interior cross-sectional configuration that substantially matches an exterior profile of side rail 12, for example, the C-shaped structure shown (see FIG. 3). Accordingly, both arms 28 and/or connector 30 may grip side rail 12 adjustably, as described below.

Receiver 24 is secured to crossbar 16, either permanently or removably. For example the receiver may secured to crossbar 16 by an adhesive, rivets, threaded fasteners, threaded engagement with an end of the crossbar, or formed integrally with the crossbar, among others. Here, receiver 24 defines a recess 32 in which crossbar 16 is received and secured by adhesive 34.

Clamp 22 and receiver 24 may be configured to fit together using male and female mating structures 36, 38. Mating structures generally include any complementary structures that allow clamp 22 and receiver 24 to be assembled and that limit their ability to move relative to each other before fastening (see below). Here, arms 28 extend to define male structures 36, which are received by matching female structures 38, formed as recesses in receiver 24. In alternative embodiments, clamp 22 and receiver 24 may have any suitable combination of male and female mating structures.

Mating structures may contact along ramped surfaces 40, 42. Ramped surfaces are oriented so that clamp 22 slides toward receiver 24 and crossbar 16 as arms 28 are urged together along a vertical axis by a fastener mechanism (see below). This sliding motion may be used to grip rail 12 between connector 30 and an opposing wall 44 of receiver 24, as an alternative to, or in addition to, gripping above and below rail 12 by arms 28. Clamp 22 and receiver 24 each may include a single ramped surface 40, 42, or, as shown here, may include plural surfaces that converge centrally toward crossbar 16. Surfaces 40, 42 are generally oriented obliquely to a horizontal plane by clockwise or counter-clockwise rotation about an axis parallel to the long axis of rail 12.

Clamp 22 and receiver 24 fit together to produce one or more shared passages 46. Here, two vertically disposed passages are produced by aligned through-holes provided by each of clamp 22 and receiver 24. However, any suitable number of passages may be provided and may be formed by recesses, slots, apertures, and/or the like in clamp 22 and receiver 24. Passages 46 may be somewhat elongated within clamp 22 and/or receiver 24 along an axis that parallels the crossbar. This elongation may allow the sliding motion of ramped surfaces 40, 42 described above relative to fasteners received by the passages (see below).

Figure 4:
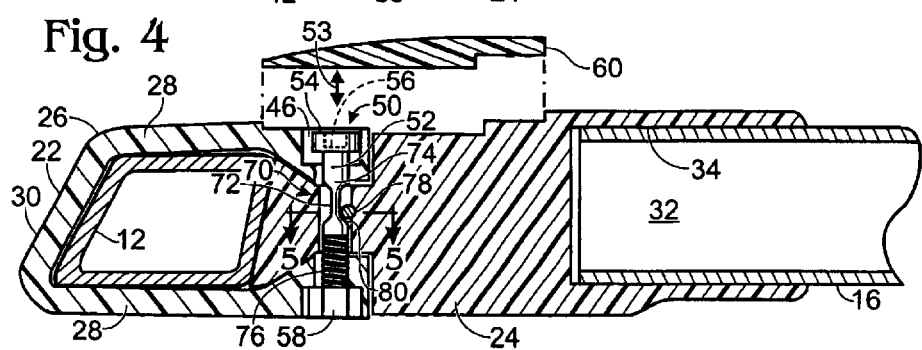
FIG. 4 is a cross-sectional view of the coupling device of FIG. 2 viewed generally along 3—3 of FIG. 2, but with the grip released to allow re-positioning of the device along the side rail.

FIG. 4 shows a fastener mechanism 50 that joins clamp 22 and receiver 24. Mechanism 50 may be received in each passage 46 and engaged therein. Once properly engaged, fastener mechanism 50 is dimensioned so that clamp 22 and receiver 24 cannot be uncoupled. Engaged fastener mechanism 50 also may adjust how tightly clamp 22 grips rail 12, so that clamp 22 and crossbar 16 have a fixed position or are positionable by sliding along rail 12.

Fastener mechanism 50 may include a fastener member 52 that moves along an axis 53 to engage, adjust, and/or disengage the mechanism. For example, fastener member 52 may be threaded, such as the bolt shown, so that rotation moves member 52 along a vertical axis corresponding to its long axis. Fastener member 52 may have a head 54 with any suitable structure for gripping by tools, such as a hexagonal recess 56, or a hexagonal perimeter, among others. Head 54 may be disposed in a recessed configuration within fastener passage 46 to minimize undesired access to narrower regions of fastener member 52. Fastener member 52 may engage with a threaded partner, such as a nut 58 carried here by clamp 22 or by a threaded partner in receiver 24. Nut 58 may be introduced into coupling device 20 during molding, by bonding, and/or nut 58 may be positioned in a recess that renders the nut inaccessible to tools, among others. In alternative embodiments, fastener member 52 may move along axis 53 to engage adjustably by any suitable mechanism, including nonthreaded mechanisms. Head 54 and/or nut 58 may be hidden and/or protected by a cover 60 that is fastened in place.

Figure 5:
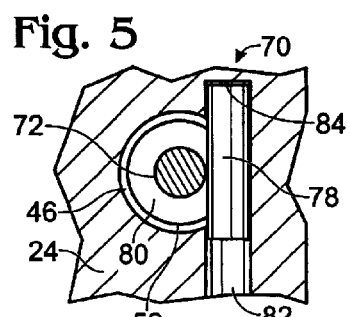
FIG. 5 is fragmentary, cross-sectional view of the coupling device of FIG. 2, viewed generally along 4—4 of FIG. 4, showing a security mechanism that prohibits removal of the coupling device.

FIG. 5 shows a security mechanism 70 that may be implemented to prohibit disengagement of fastener mechanism 50. Security mechanism 70 may include a narrowed region or neck 72 on fastener member 52. The narrowed neck may be formed as a region of decreased diameter that defines an annular recess on shank 74 of fastener member 52. Neck 72 also may be disposed intermediate a threaded region 76 and head 54, generally so that neck 72 and threaded region 76 are nonoverlapping.

Security mechanism 70 may include a retaining member 78 that implements the security mechanism. Retaining member 78 may be disposed proximal to neck 72 after engagement of fastener mechanism 50, so that retaining member 78 overlaps the recess defined by neck 72. In this position, retaining member 78 allows fastener member 52 to rotate and move axially through a limited distance. This limited distance may adjust clamp 22 between gripping (fixed) and loosened (movable) conditions, shown in FIGS. 3 and 4, respectively.

FIG. 4 shows that neck 72 may be positioned and dimensioned so that fastener member 52 (and fastener mechanism 50) is prohibited from disengagement and removal by retaining member 78. Retaining member 78 contacts a shoulder 80 of neck 72 that blocks disengagement of fastener member 52. In alternative embodiments, neck 72 and/or retaining member 78 may be positioned and dimensioned to allow any suitable extent of adjustable engagement.

Security mechanism 70 may be intended to be irreversible or reversible after implementation with retaining member 78. When irreversible, no provision is made to allow retaining member to be removed. For example, security mechanism 70 may be implemented by positioning retaining member 78 within retainer passage 82 of receiver 24 and/or clamp 22 (see FIG. 2). Retainer passage 82 joins fastener passage 46, allowing retaining member 78 to be positioned proximal to neck region 72 (see FIG. 5). However, retainer passage 82 may be a blind passage, shown at 84, to prohibit removal of retaining member 78. Retainer passage 82 may be disposed perpendicular to fastener passage 46, as shown. Retainer passage 82 may be nonlinear so that retaining member 78 cannot be accessed readily with tools and/or may have a length that is substantially greater than the length of retaining member 78. Alternatively or in addition, retainer passage 82 may include retention structure, such as ribs or other protrusions, among others, that hold retaining member 78 in position. Accordingly, retaining member 78 may be a rod, a pin, a ball, and/or an expandable clip that is dimensioned or structured to be permanently disposed proximal to neck 72, among others. When security mechanism 80 is intended to be reversible, provision is made for removing retaining member 78 at a desired time. In these cases, retaining member 78 may be accessible after implementation, for example, retainer passage 82 may be a through-hole that allows retaining member to be removed readily without damaging the coupling device or retaining member. Alternatively, or in addition, retaining member may be switchably or rotationally implemented in a manner than can be readily reversed.

Coupling device 20 may be attached and used as follows. This description is intended to be exemplary only and is not intended to limit the scope of the invention.

Clamp 22 is placed on side rail 12 by urging arms 28 slightly apart, so that clamp 22 extends around rail 12, with connector 30 disposed laterally. Receiver 24, generally with a crossbar already attached, is fitted together with clamp 22, so that male mating structures 36 fit into female mating structures 38, and ramped surfaces 40, 42 are in contact or are closely apposed. This fitting together forms fastener passages 46. Fastener members 52 are placed through fastener passages 46 and rotationally engaged with nuts 58. As fastener members 52 are tightened on nuts 58 through rotation, arms 28 are pulled together along axis 53. In addition, ramped surfaces 40, 42, slide past each other. This sliding motion converts a vertical compressive force exerted by fastener mechanism 50 into an orthogonal force that pulls clamp 22 and receiver 24 together along an axis generally parallel to the long axis of the crossbar. Coupling device 20 may be used in this configuration to fix or re-position crossbar 16, without implementing security mechanism 70, but the device may lack theft-resistance.

Security mechanism 70 may be implemented as follows. Retaining member 78 is inserted into retainer passage 82 and positioned. Positioning may be carried out, for example, by pushing member 78 with a flexible elongate rod until member 78 occupies a portion of the annular recess defined by neck 72. When plural fastener mechanisms 50 are used to join clamp 22 and receiver 24, as in device 20, one or more of the mechanisms may be secured with a retaining member(s).

The specific embodiments disclosed and illustrated herein should not be considered as limiting the scope of the invention, as understood by a person having ordinary skill in the art. Numerous variations are possible without falling outside the scope of the appended claims. The subject matter of the invention includes all novel and nonobvious combinations and subcombinations of the various elements, features, functions, and/or properties disclosed herein.

We claim:

1. A coupling device for attaching a crossbar to a rail of a vehicle rack, comprising:
   a first portion configured for connection to the crossbar;
   a second portion configured for connection to the rail, the second portion fitting together with the first portion to define a passage along an axis;
   a fastener member that is received in the passage to join the first portion to the second portion and to couple the second portion to the rail; and
   a security mechanism configured to prohibit complete disengagement of the fastener member from the passage but to allow limited movement of the fastener member along the axis, the limited movement adjusting the second portion between fixed and movable positions on the rail, thereby allowing the crossbar to be re-positioned but not removed from the rail;
   wherein the fastener member defines an annular recess, the security mechanism including a retaining member, wherein the security mechanism is implemented by disposing the retaining member at least partially in the annular recess, and further wherein the passage is a first passage, and at least one of the first and second portions defines a second passage that joins the first passage, the second passage being configured to receive the retaining member or implementation of the security mechanism.

2. The coupling device of claim 1, wherein the first and second portions are formed together as a unit.

3. The coupling device of claim 1, wherein the first and second portions are separate pieces.

4. The coupling device of claim 1, wherein the security mechanism is configured to be implemented volitionally in a separate step from inserting the fastener member in the first passage.

5. The coupling device of claim 1, wherein the security mechanism is configured to be implemented irreversibly.

6. The coupling device of claim 1, wherein the fastener member is threaded, and the fastener member moves along the axis and engages at least part of the first passage by rotation.

7. The coupling device of claim 1, wherein the second portion is configured to substantially encompass the rail.

8. The coupling device of claim 1, wherein the second portion includes opposing sides, and the opposing sides grip the rail in the fixed positions.

9. The coupling device of claim 1, wherein the fastener member includes a shaft having a narrowed neck region, and the retaining member is disposed adjacent the narrowed neck region of the fastener member to prohibit the disengagement of the fastener member from the first passage.

10. The coupling device of claim 1, wherein the first passage is substantially perpendicular to the second passage.

11. A coupling device for attaching a rack component to a vehicle rack, comprising:
    a first portion for attachment to the rack component;
    a second portion that joins to the first portion;
    a fastener member that couples the second portion to the vehicle rack, the fastener member coupling and uncoupling by moving along an axis; and
    a security mechanism configured to prohibit complete removal of the fastener member from the second portion but to allow limited movement of the fastener member along the axis, the limited movement adjusting the second portion between fixed and movable positions on the vehicle rack, thereby allowing the rack component to be re-positioned but not removed from the vehicle rack, wherein the security mechanism includes a retaining member, a least one of the first and second portions including a passage that receives the retaining member from exterior the device to prohibit the uncoupling.

12. The coupling device of claim 11, wherein the security mechanism is configured to be implemented volitionally, implementation being separate from the coupling by the fastener member.

13. The coupling device of claim 11, wherein the security mechanism is configured to be implemented irreversibly.

14. The coupling device of claim 11, wherein the fastener member includes nonoverlapping first and second regions, the first region engaging the second portion, and the second region of the fastener member forming part of the security mechanism.

15. The coupling device of claim 11, wherein the fastener member has an elongate body with a narrowed neck region, the narrowed neck region forming part of the security mechanism.

16. The coupling device of claim 11, wherein the fastener member includes a head and a shank, the shank including a threaded region that engages the second portion to provide the coupling and a retaining portion that forms part of the security mechanism, the retaining portion being disposed intermediate the threaded region and the head.

17. The coupling device of claim 11, wherein the first and second portions are formed separate and configured to fit together, the fastener mechanism joining the first and second portions as it couples the second portion to the vehicle rack.

18. The coupling device of claim 11, wherein the first and second portions fit together to form a passage, the axis extending through the passage.

19. The coupling device of claim 11, wherein the fastener member is a bolt.

20. The coupling device of claim 11, wherein the second portion is configured to substantially encompass and grip a region of the vehicle rack.

21. The coupling device of claim 11, the rack component being a crossbar, and the second portion coupling the crossbar to a side rail of the vehicle rack.

22. The coupling device of claim 11, wherein the fastener member has a body with a narrowed neck, and the retaining member contacting the narrowed neck to prohibit complete removal of the fastener member from the second portion.

23. A coupling device for attaching a crossbar to a rail of a vehicle rack, comprising:
   a first portion configure for attachment to the crossbar;
   a second portion configured for attachment to the rail, the second portion fitting together with the first portion to define a passage;
   a fastener member that is received in the passage to join the first portion to the second portion and to couple the second portion to the rail, wherein the fastener member includes a shank having a narrowed neck region, and further wherein the fastener member adjusts how tightly at least two non-parallel sides of the second portion grips the rail; and
   a retaining member configured to be positioned adjacent the narrowed neck region of the fastener member, thereby prohibiting complete disengagement of the fastener member from the passage, but allowing limited movement of the fastener member within the passage, so that the crossbar can be re-positioned but not removed from the rail.

24. The coupling device of claim 23, wherein the shank includes threads and the fastener member moves along the passage by rotation.

25. The coupling device of claim 23, wherein the retaining member is configured to be positioned adjacent the narrowed neck region irreversibly.

26. The coupling device of claim 23, wherein the second portion includes a clamp configured to extend substantially around the rail, and the fastener member adjusts how tightly the lamp grips the rail.

27. A coupling device for attaching a crossbar to a rail of a vehicle rack, comprising:
   a first portion for attachment to the crossbar, the first portion having a first surface;
   a second portion including opposing sides configured to flank the rail above and below and having a second surface, the second portion fitting together with the first portion to appose the first and second surfaces and to define a passage; and
   a fastener member received in the passage, the fastener member being movable through the passage along a first axis to join the first portion to the second portion and to couple the second portion to the rail,
   wherein the fastener member and the first and second surfaces are oriented to produce sliding motion of the first surface along the second surface in response to movement of the fastener member along the first axis, the sliding motion urging the second portion toward the first portion generally along a second axis that is orthogonal both to the first axis and to a long axis of the rail.

28. The coupling device of claim 27, each of the first and second surfaces including plural surfaces, and the plural surfaces of the second portion being configured to slide along the plural surfaces of the first portion.

29. The coupling device of claim 27, wherein the plural surfaces of the first and second portions are configured to converge toward the crossbar.

30. The coupling device of claim 27, wherein the second portion includes a connecting region that joins the opposing sides, the first portion including a side wall that opposes the connecting region of the second portion when the first and second portions are fitted together, and the side wall and connecting region being urged together in response to sliding motion.

31. The coupling device of claim 27, wherein the first and second surfaces are configured to be oriented obliquely to the first and second axes.

32. The coupling device of claim 27, wherein the fastener member is threaded, and the fastener member moves along the first axis and engages at least part of the passage by rotation.

33. The coupling device of claim 27, wherein the second portion is configured to substantially encompass the rail.

34. The coupling device of claim 27, wherein the second portion includes opposing sides, and the opposing sides grip the rail.

35. The coupling device of claim 27, further comprising:
   a security mechanism configured to prohibit complete disengagement of the fastener member from the passage but to allow limited movement of the fastener member along the first axis, the limited movement adjusting the second portion between fixed and movable positions on the rail, thereby allowing the crossbar to be re-positioned but not removed from the rail.

36. The coupling device of claim 35, wherein the security mechanism is configured to be implemented volitionally in a separate step from inserting the fastener member in the passage.

37. The coupling device of claim 35, wherein the security mechanism is configured to be implemented irreversibly.

38. The coupling device of claim 35, wherein the fastener member includes a shaft having a narrowed neck region, the security mechanism including a retaining member that is disposed adjacent the narrowed neck region of the fastener member to prohibit the disengagement of the fastener member from the passage.

39. The coupling device of claim 35, wherein the fastener member defines an annular recess, the security mechanism including a retaining member, and wherein the security mechanism is implemented by disposing the retaining member at least partially in the annular recess.

40. The coupling device of claim 35, wherein the passage is a first passage, and at least one of the first and second portions defines a second passage that joins the first passage, the second passage being configured to receive the retaining member for implementation of the security mechanism.

41. The coupling device of claim 40, wherein the first passage is substantially perpendicular to the second passage.

42. An apparatus for carrying cargo on a vehicle having a pair of rails, comprising:

a crossbar having an end portion;

a clamp portion, the clamp portion being configured for connection to one of the rails, the clamp portion fitting together with the end portion to define a passage along an axis;

a fastener member that is received in the passage to join the end portion to the clamp portion and to couple the clamp portion to the one rail, wherein the fastener member adjusts how tightly at least two non-parallel sides of the clamp portion grips the one rail; and a security mechanism configured to prohibit complete disengagement of the fastener member from the passage but to allow limited movement of the fastener member along the axis, the limited movement adjusting the clamp portion between fixed and movable positions on the one rail, thereby allowing the crossbar to be re-positioned but not removed from the one rail.

43. The apparatus of claim 42, the crossbar having a middle portion disposed adjacent the end portion, and the middle portion being formed separately from the end portion.

44. The apparatus of claim 42, the crossbar having a middle portion disposed adjacent the end portion, and the middle portion being formed unitarily with the end portion.

45. The apparatus of claim 42, the end portion being a first end portion, the crossbar having a second end portion that opposes the first end portion, the clamp portion being a first clamp portion, and the apparatus further comprising a second clamp portion that is substantially similar to the first clamp portion.

* * * * *